Nov. 7, 1967     P. L. FINELLI ET AL     3,350,990

CAMERA APPARATUS

Filed April 16, 1965     6 Sheets-Sheet 1

INVENTORS
Patrick L. Finelli
and
BY Herbert A. Bing

Brown and Mikulka

ATTORNEYS

INVENTORS
Patrick L. Finelli
and
BY Herbert A. Bing
Brown and Mikulka
ATTORNEYS

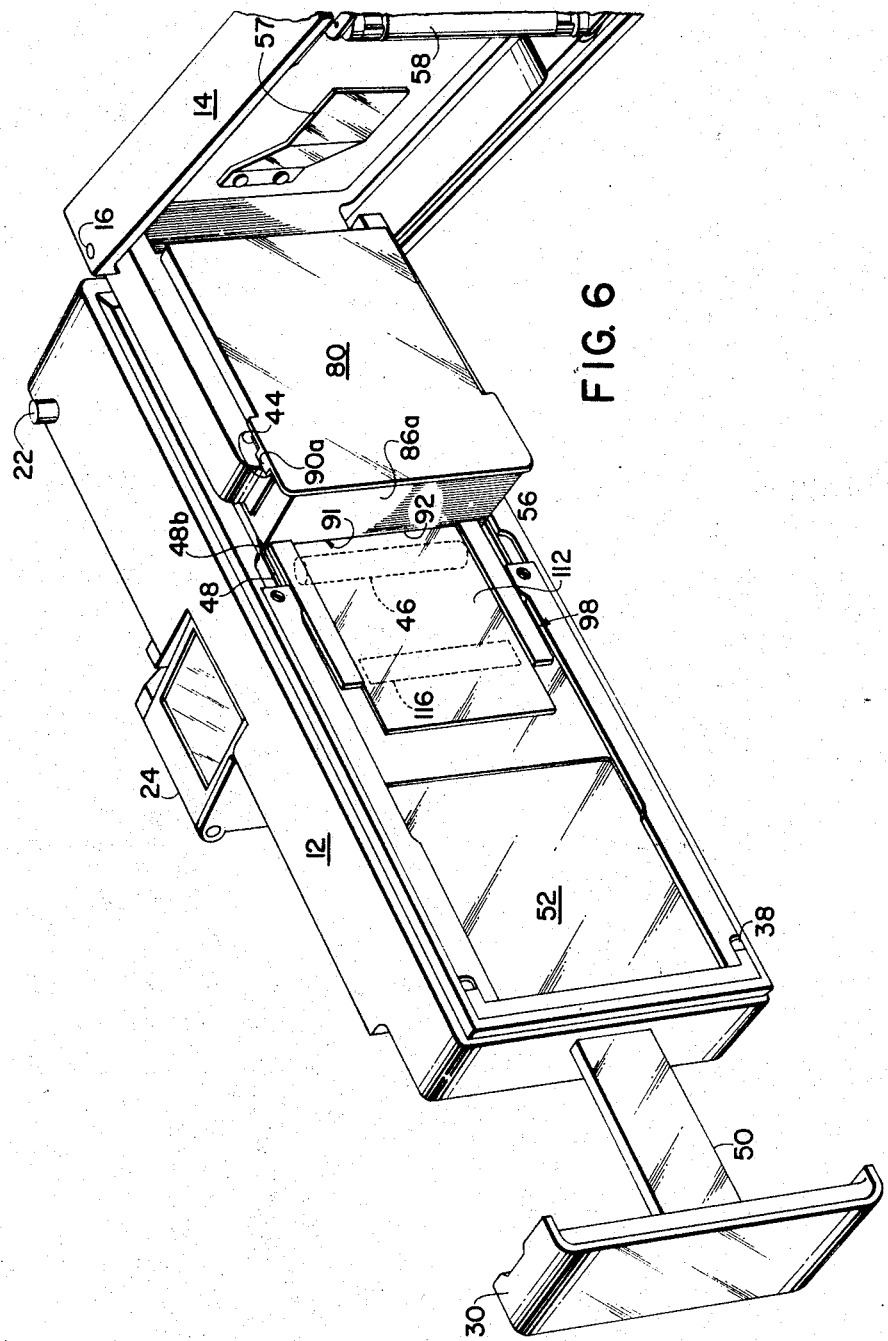

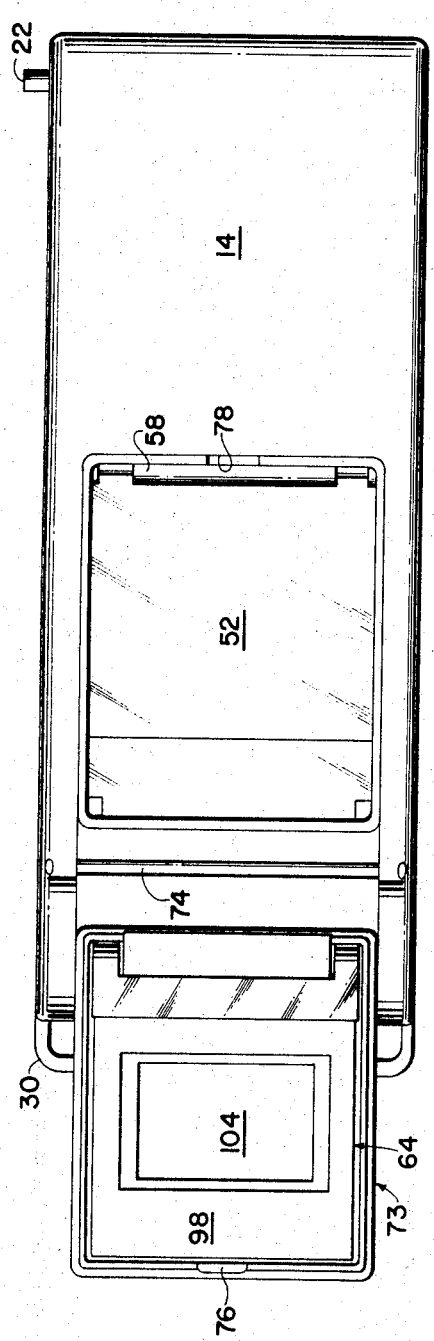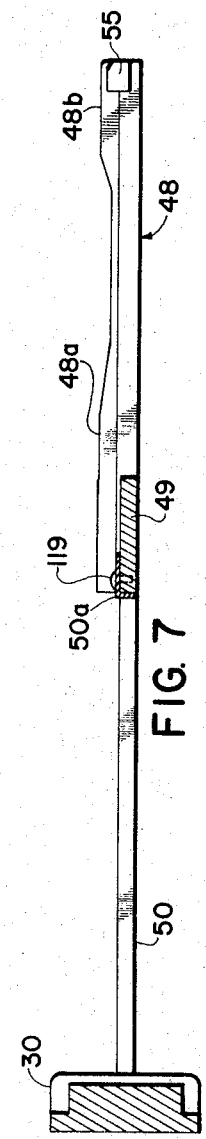

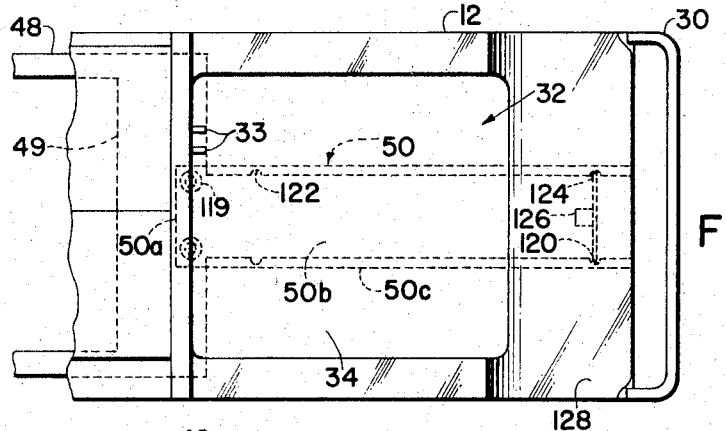
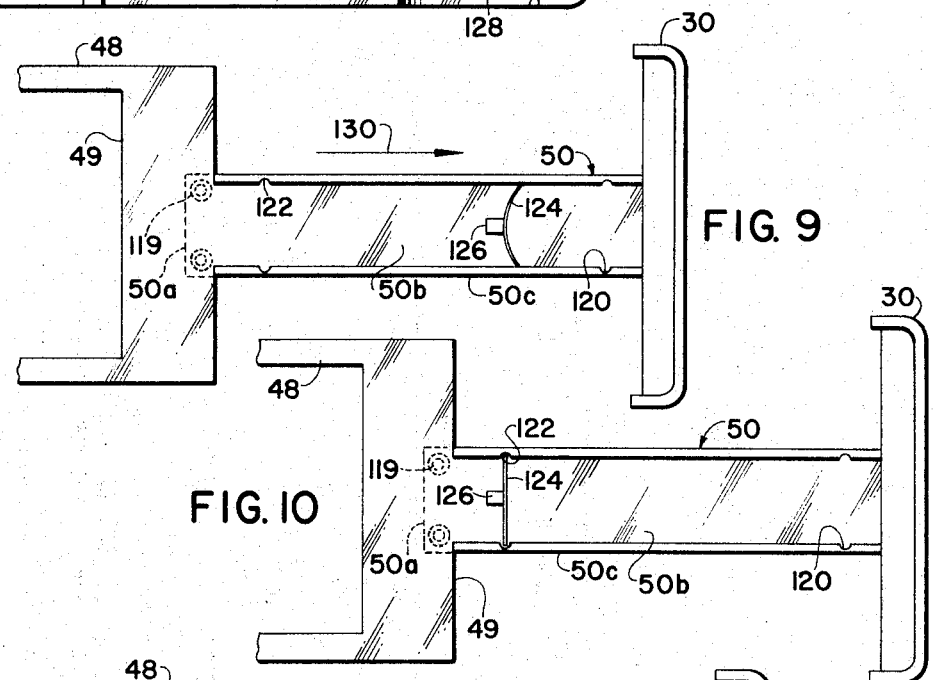
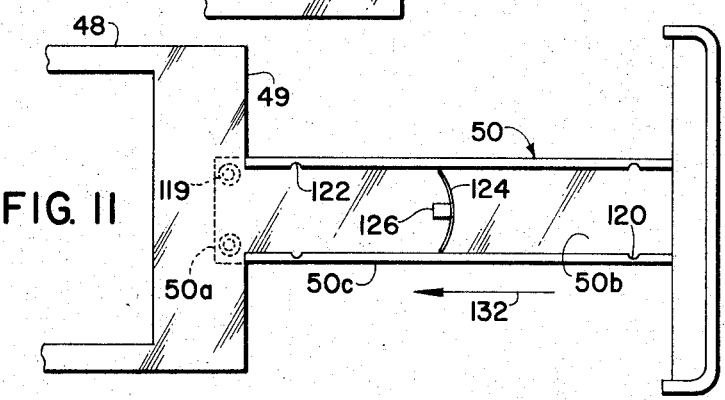

United States Patent Office 3,350,990
Patented Nov. 7, 1967

3,350,990
CAMERA APPARATUS
Patrick L. Finelli, Sudbury, and Herbert A. Bing, Wellesley, Mass., assignors to Polaroid Corporation, Cambridge, Mass., a corporation of Delaware
Filed Apr. 16, 1965, Ser. No. 448,630
21 Claims. (Cl. 95—13)

ABSTRACT OF THE DISCLOSURE

The present disclosure relates to a camera of a miniature or so-called 35 mm. type embodying structural elements which cooperate to effect the loading, exposure, processing and removal of a film pack used therewith. Each film unit of the film pack embodies a processing liquid which is released when the unit is subjected to compressive means. It also includes a mount which provides a fully-mounted transparency, ready for projection, immediately following its processing. The processing apparatus, in brief, includes a magazine, a transport means for drawing the film unit between a pair of pressure rolls and depositing the compressed unit in a light-tight chamber whereat its processing is completed. The pressure rolls are closed and opened in a programmed sequence. Access to the chamber is provided for removal of processed prints.

The film assembly employed in the subject camera comprises a releasably-carried processing liquid. It is of a multilayer structure such that, after exposure, release of the liquid by the application of a compressive force to a liquid-containing component thereof and imbibition of the liquid into predetermined layers, including an exposed silver halide emulsion layer, provide an image. The image is formed by the transfer of image-forming substances to a designated image-receiving surface. Processing is initiated by moving the film assembly between compressive means and involves mechanical transport means operating according to a predetermined program. A processing liquid suitable for use in forming the image may comprise an aqueous solution of a silver halide developer such as hydroquinone, a silver halide solvent of the type of sodium triosulfate, and an alkaline substance such as sodium hydroxide. It may also preferably include a thickening or film-forming agent such as a synthetic polymer of the type of sodium carboxymethyl cellulose and, possibly, a high-molecular-weight polymeric mordant to facilitate the transfer process. In producing a black-and-white image, a latent image is developed; the exposed silver halide is reduced to silver, and the unreduced silver halide forms a soluble silver complex which is transferred from undeveloped areas to the image-receiving surface, the image being formed on the latter in silver. In the production of a color transparency, substances capable of forming dye images at the image-receiving surface such as dyes, color couplers, or the like, may be employed in the transfer process. Methods and film materials for producing black-and-white or multicolored images, of categories broadly related to those contemplated herein, are described in U.S. Patents Nos. 2,543,181, 2,614,926, 2,707,150, 2,968,554 and 2,983,606.

The camera of the subject invention is primarily intended to combine the rapid processing advantages of the conventional Polaroid Land camera, sold by Polaroid Corporation of Cambridge, Mass., U.S.A., with those of a flexible, compact picture-taking instrument of the 35 mm. or small camera category. An obvious advantage of such a camera in the 35 mm. field wherein any fault may be magnified in projection, is that it enables the operator to see almost immediately the results of an exposure and make whatever corrections are necessary in a subsequent exposure. The print may be inspected, immediately after stripping away a negative portion, in conjunction with a magnifying viewer which latter, if desired, may be incorporated with the camera. Inasmuch as the completed transparency is removed from the camera already located in a slide mount, it can be handled easily and with little danger of injury to its surface. Moreover, being already mounted, it is in approximate readiness for use with a conventional projector, without the usual delay and extra expense attendant upon an additional mounting procedure.

In accordance with the foregoing considerations, objects of the invention are to provide a miniature camera of the character described which, quickly following each photographic exposure, produces a completely processed and mounted transparency in black-and-white or full color according to the type of film used; to provide a camera adapted to accommodate a film pack and capable of producing a succession of mounted transparencies, as described, without requiring a delay between successive exposures because of any time limitation inherent in the diffusion transfer process; to provide a camera of the aforesaid category wherein processing of each film unit or assembly is accomplished in conjunction with mechanical transport means and a programmed operation thereof rather than through the expedient of manually drawing upon a film-assembly leader to effect its advancement and processing; and to provide a camera embodying such mechanical transport means in which a complete cycle of processing a given film assembly is insured before commencing processing of a succeeding film assembly.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 6 is a fragmentary, perspective rear view of the camera illustrating the mounted magazine and transport of an exposed film assembly;

FIG. 7 is a fragmentary side view, partly in section, of the film-assembly transport mechanism, illustrating the camming portions;

FIGS. 8 to 11 are fragmentary front views of the film-assembly transport mechanism illustrating associated locking means for insuring a full cycle of operation of the transport mechanism with respect to a film assembly before it is permitted to operate relative to a succeeding film assembly;

FIG. 13 is a rear elevation view of the camera back with the door of a film assembly storage chamber swung to open position for removal of mounted film assemblies which have been exposed and processed.

Figure 1:
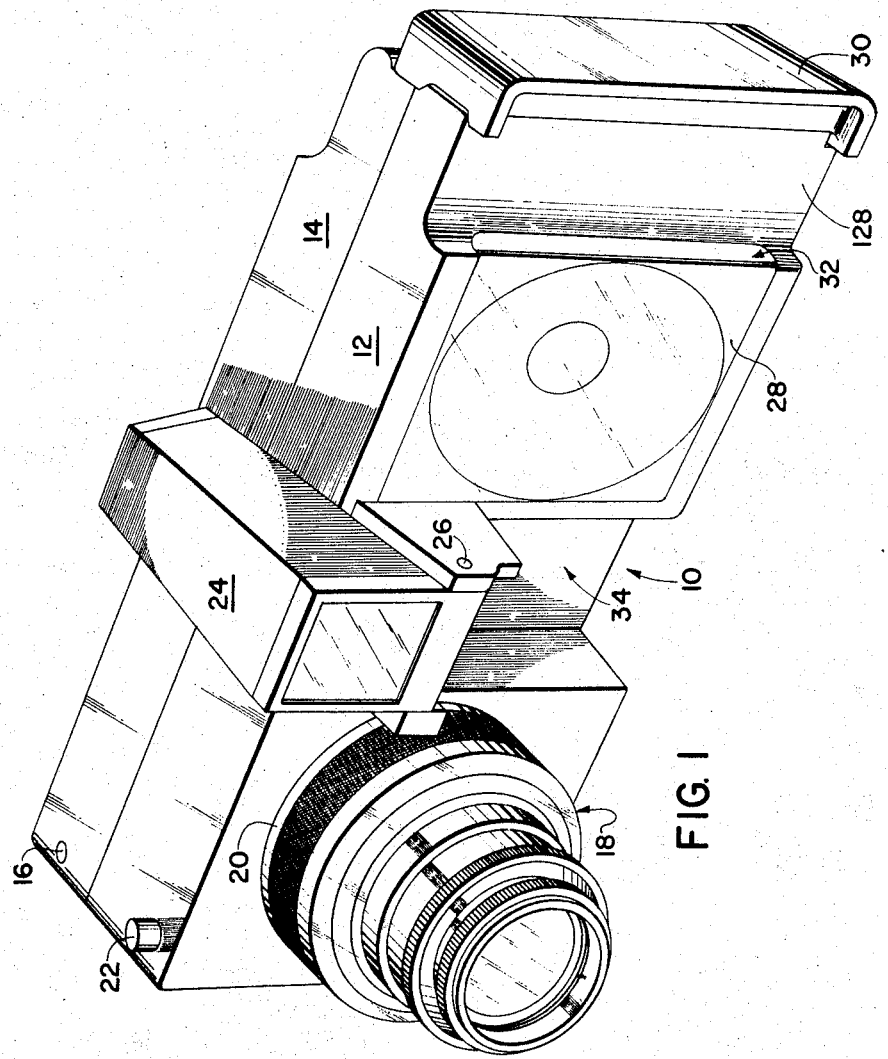
FIGURE 1 is a front view, in perspective, of the camera of the invention.

Referring now to FIGURE 1, the camera 10 of the present invention is illustrated from the front, the components shown including a camera front or frontal housing section 12, a camera back or rear housing section 14, a hinge or pivot pin 16 permitting the front and back to be swung to open position, a lens, diaphragm and shutter assembly 18, a shutter cocking ring 20, a shutter release button 22, a finder 24 pivotally mounted at pin 26 and shown at operative position, a flashgun 28, and a handle 30 constituting a part of the film-assembly transport and processing mechanism. The flashgun 28 is slidably and releasably mounted endwise in a recess 32, electrical contacts 33 therefor being shown in FIG. 8. The finder is pivoted downwardly into a recess 34 when not in use. The terms "front" or "forward" and "rear," when used herein in a directional sense, refer to front and rear locations in the camera, that is, proximity to or remoteness from the camera lens, respectively. The terms "top" and "bottom" or "upper" and "lower" refer to locations with the camera positioned with its long dimension extending horizontally, as illustrated in the figures. The camera housing, of which the aforesaid front and back are components, may appropriately be formed of a metal such as aluminum or of a suitable plastic.

Figure 2:
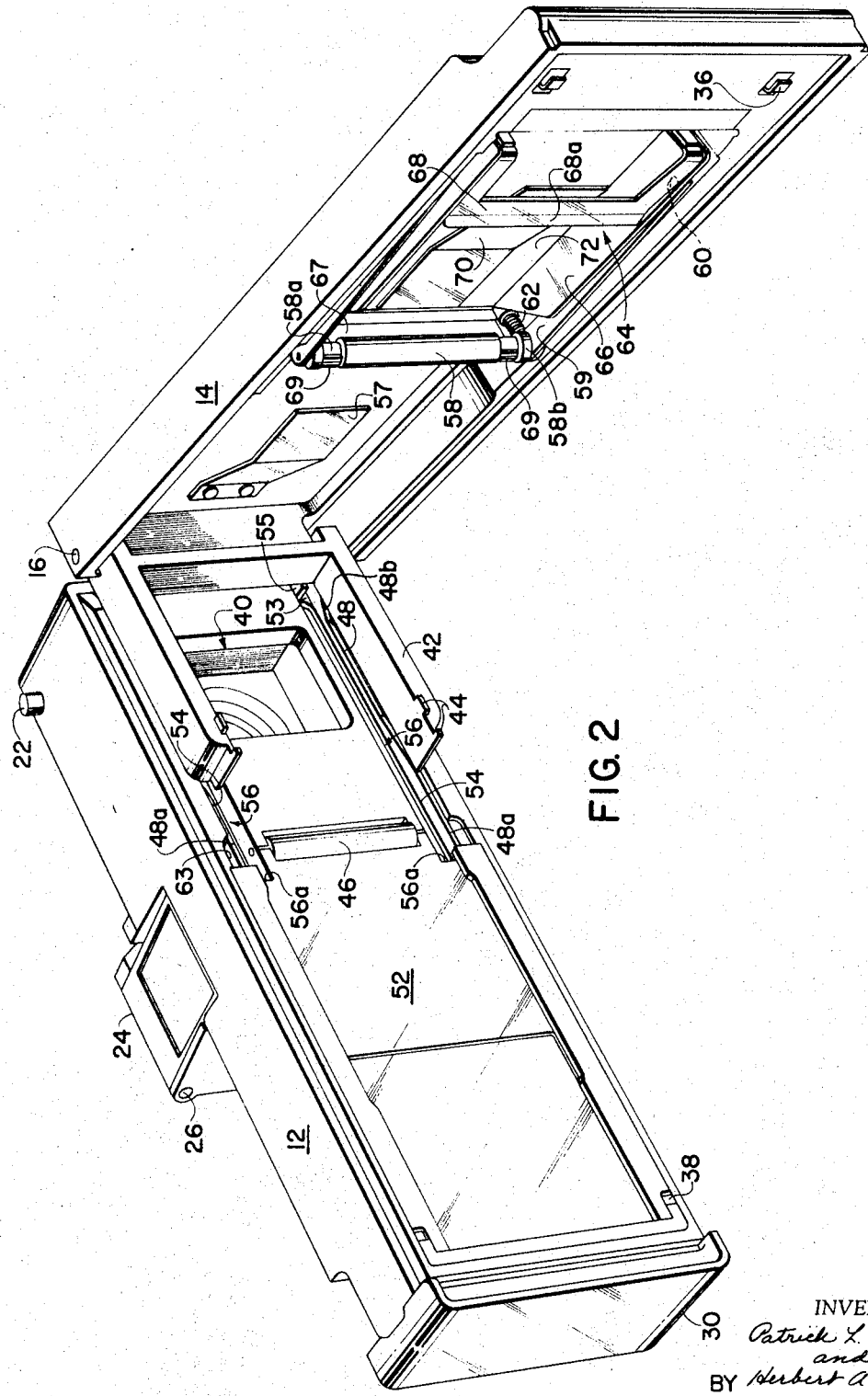
FIG. 2 is a perspective rear view of the opened camera illustrating interior portions.

In FIG. 2, the movable latch fingers 36 have been released manually from the fixed latch members 38 by an actuating lever (not shown) at the bottom of the camera and the camera front 12 and back 14 have been swung to open position on hinge element 16. The finder 24 has been pivoted to inoperative position. Elements of the front or frontal housing 12, in addition to those previously described, include the exposure aperture 40, around the exposure aperture the rearwardly-projecting flange-like wall elements 42 providing a partial enclosure or chamber for receiving the film-pack container or magazine and having further rearwardly-projecting magazine-positioning and locking flange members 44, the rotatably-mounted pressure roll 46, the pair of laterally-spaced film assembly transport arm elements 48 which, through the medium of an integral cross-piece 49 and a bar element 50 located in the area underlying the generally planar platform 52 and shown in FIGS. 7–11, are attached to the handle 30. The elements 48 are thus rendered movable along the spaced, longitudinally extending, parallel tracks or channels 54 in response to manual movement of the handle 30. It will be noted that the channels 54 also in part underlie the wall members 42 and in part underlie the platform 52. Each arm 48 includes two raised surface portions 48a and 48b at longitudinally-spaced locations on its rear surfaces which serve a camming function with respect to film-assembly compressive means, to be described below. Each arm 48 also includes an inwardly-disposed transverse portion 53 terminating in a film-assembly contacting member or lug 55 at the right-hand extremity (FIG. 2) of its rear surface. The lugs 55 bear against the trailing edge of each film-assembly mount for the purpose of propelling or carrying it in a direction to the left toward and between the pressure rolls, as viewed in FIG. 2, when the handle 30 is drawn outwardly of the camera or to the left (FIG. 2). The tracks 54 and longitudinal slots 56 serve the dual function of permitting forward portions of the magazine to enter the same for positioning purposes and guiding the lugs 55 in their longitudinal movement.

Further referring to FIG. 2, the elements of the camera back or rear housing 14 include a flat spring 57 which bears against the rear surface of the magazine when it is mounted in chamber means 42 urging it forwardly and a rotatably-mounted pressure roll 58 which includes the peripheral grooves 58a and the peripheral flanges 58b. Pressure roll 58 is mounted for translational movement through the medium of a pair of arms 59, the latter being pivotally attached to the camera back at 60. The pressure roll is biased forwardly, that is, toward pressure roll 46 by two compression springs 62 which bear against the extremities of arms 59. A limit stop means (not shown) is provided to prevent an unlimited forward movement of the pressure roll. It will be understood that when the camera front 12 and back 14 are pivoted to closed position and latched, the two pressure rolls 46 and 58 are brought close together in functional compressive relation. The cut-away areas 63 of the camera front permit the peripheral flanges 58b of pressure roll 58 to contact the raised camming portions 48a of the film-assembly transport arms 48 when the camera front and back sections are closed and the aforesaid camming portions have been moved to juxtaposition therewith.

Continuing the description of the structure of the camera back 14 is a film-assembly storage chamber 64, into which each film assembly is deposited after it has concluded its passage between the pressure rolls. The chamber is of a capacity adapted to accommodate the processed film assemblies of at least an entire film pack. Thus, processing of each film unit, which requires a few seconds after release and spreading of the processing liquid, may be completed in the chamber without delaying the exposure and processing of succeeding film units. The chamber 64 includes the longitudinally-extending side-wall members 66, a light-shielding end-wall 67 adjacent to the pressure roll 58, the transverse frontal holding plate 68 having a flared film-assembly guiding entrance portion 68a and the flat spring 70 which guides and holds the deposited film assemblies firmly in the chamber. Two curved resilient strip-like elements 69 extend generally forwardly from the forward edge of end-wall 67 and project into the pressure roll grooves 58a. They also serve a light-shielding function, especially when no film assembly is positioned between the pressure rolls and when, as described below, the storage chamber 64 is opened.

Completing the structure of the camera back or rear housing 14, the rear wall 72 of the chamber 64 is actually a pivotally mounted section of the rear wall of the camera housing itself and, as indicated in FIG. 13, is hinged at 74 and capable of being held at closed position by manually-movable and fixed latch means 76 and 78, respectively, the movable member being operated by an externally located button (not shown) protruding through a slot in the rear-wall section 72. The construction, above described, permits storage chamber 64 to be opened and swung rearwardly for removal of one or more processed film assemblies. Any film assemblies remaining at the exposure aperture are protected against exposure when opening the door of storage chamber 64 by the light-sealing elements 67 and 69.

Figure 3:
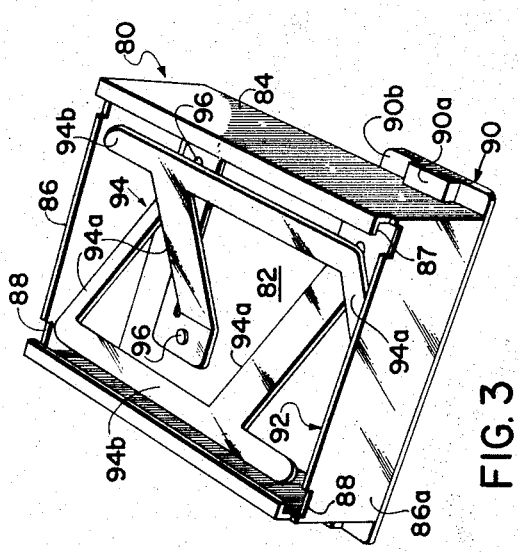
FIG. 3 is a perspective front view of the film-assembly container or magazine showing a spring element for urging the film assemblies forwardly therewithin.

The container or magazine 80 for accommodating a plurality of film assemblies in the form of a film pack, as, for example, eight such assemblies, is illustrated from the front in FIG. 3. When thus loaded, it is adapted to be mounted within the semi-enclosure provided by wall elements 42 with its open front, shown uppermost in FIG. 3, facing the exposure aperture 40 of the camera. The container may, appropriately, be formed of a metal or a rigid plastic such as an opaque polystyrene and is generally to be construed as of a disposal type, that is, the film-pack and container are provided and may be purchased as a unit and may be thrown away after the last film assembly has been exposed and processed. Alternatively, the container could be preserved and could be regarded as a component of the camera itself and reloaded upon using the last film assembly. The container includes a rear wall member 82, the longitudinal side-wall members 84 and the end members 86 and 86a. The longitudinally-disposed flanges 87 hold the film assemblies within the container in channels formed thereby and establish a foremost film assembly at the focal plane when the container is mounted in the camera. The slots 88, formed in the end members, permit both film-assembly transport mechanism, to be described below, and side frame members of the film mount to move freely therethrough in and out of the container. A pair of two-stepped positioning flanges 90, including a central portion 90a and contiguous portions 90b, in part rests upon and in part fits within the positioning and locking members 44. The flanges 90 and members 44 cooperate to hold the container against sideways movement and to determine the width of a gap or slot-like aperture 91 which is provided between the forward edge 92 of the end member 86a and the platform 52 through which each foremost film assembly is slidably drawn sideways from the container 80 after its photographic exposure. An element 94 constituting, in effect, a pressure plate, formed of a single contoured piece of resilient material such as a spring metal or a plastic, e.g., a Phosphor bronze or a thermoplastic resin of the acetal family, is attached to the rear wall 82 by any suitable bonding means as, for example, by the rivets 96. The pressure plate 94 comprises two pairs of forwardly-extending members 94a connected by cross-bars 94b. The cross-bars serve as two, spaced, similarly-tensioned bearing surfaces for contacting the film units when loaded in the container and for urging them forwardly so that the first or outermost unit is seated firmly against the flanges 87.

Figure 5:
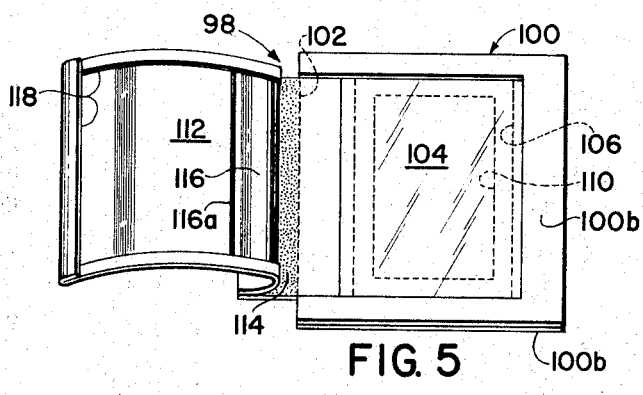
FIGS. 4 and 5 are diagrammatic rear views of a film assembly employed in the camera.
Figure 4:
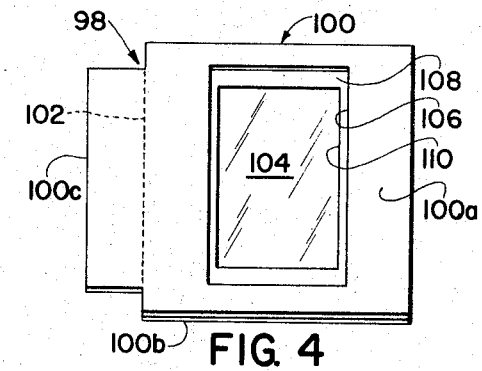

The structure of an individual film unit or assembly 98 for use in the camera of the present invention is shown from the front or exposure direction in FIG. 4; from the rear in FIG. 5; and again from the front in FIG. 13, but with the mount in its final condition ready for projection usage in the latter instance. Referring to FIG. 4, the structure shown comprises a flat, substantially rigid frame-like mount 100 composed of a cardboard, a plastic or other suitable material, and including a major front section 100a and a minor or smaller rear section 100b, the latter being superimposed with, and bonded to, the front section along three sides, exclusive of that of a flap or tab portion 100c of the front section. The flap 100c is adapted to be bent over pivotally 180° rearwardly on itself along the semi-perforations 102, after exposure and processing of the photosensitive film material 104 carried by the mount. The front section 100a has a rectangular aperture 106 formed therein, within which is a thin opaque masking element 108 composed, for example, of a metallic sheet material such as aluminum or a metalized plastic such as polyethylene terephthalate sold under the trade name of Mylar by E. I. du Pont de Nemours, Wilmington, Del., U.S.A. The latter is bonded in part to the rear surface of front section 100a and has an aperture 110 formed therein of slightly smaller dimensions than the aperture 106. The aperture of the masking element 108 is the actual exposure aperture and contributes to a sharply defined picture area, as explained below. The last-named exposure aperture may, for example, be considered as having the dimensions of the conventionally exposable area of a 24 x 35 mm. film or it may have the dimensions of another film material used in a miniature camera. Assuming the 24 x 35 mm. miniature format or film, it will be noted below that the short or 24 mm. dimension of the aperture 110 is parallel to the direction of withdrawal of the film units from the container 80 and from the focal plane following the photographic exposure. This presupposes that the camera is to be held vertically for horizontal picture taking. It is possible, however, to construct the film assembly so that the long dimension of aperture 110 is parallel to the direction of withdrawal, in which case the camera could be held horizontally to obtain a horizontal picture. The photosensitive film material 104, adapted to have an image formed therein by a diffusion transfer method of the character above-described, is mounted adjacent to the front section as, for example, by having its edges inserted in marginal areas lying between the front and rear sections and being held fixed therewithin by an adhesive. The film, thus mounted, is exposable through the aperture 110, the surface portion of the film, seen in FIG. 4, being the transparent film base or support through which the silver halide emulsion layer of the film is exposed.

A cover sheet 112, formed of an opaque paper, is superimposed with the rear or emulsion surface of the film material 104 in the area lying between the side and end members of the rear section 100b. The cover sheet serves both as a shield to prevent light from passing through the foremost film unit during its exposure when positioned across the exposure aperture 40 and from reaching other unexposed film units in the magazine 80. It also provides a barrier sheet for contributing to the spreading of a processing liquid between the inner surface of said sheet and the emulsion of the film material 104.

Cover sheet 112 is attached to the rear surface of front section 100a by a pressure-sensitive adhesive at 114. A flexible, rupturable container 116, holding a liquid processing composition, is attached to the inner surface of the cover sheet and is so positioned with respect to the film emulsion that its liquid content is released at separable edges 116a and spread over the emulsion when the film unit is progressively subjected to compression, the liquid thereafter being imbibed into the emulsion. The folded-over marginal portions 118 of the cover sheet constitute barrier or trapping elements to hold the processing liquid confined between the cover sheet and the film emulsion, thus contributing to the spreading of an even and complete layer of the liquid and preventing escape of any portion thereof from the film assembly into the camera mechanism.

A multilayer film material adapted to inclusion in a film assembly of the invention for producing black-and-white transparency comprises, in order of transmission of the light of a photographic exposure, a transparent base layer, a transparent image-receiving layer, and a photosensitive silver halide emulsion layer, the latter being located adjacent to the cover sheet 112 with the liquid container 116 positioned therebetween. The emulsion and cover sheet are stripped, manually, from the unitary image-receiving and base layers after the exposure and processing steps.

Various color film structures lend themselves to incorporation with the film assemblies or units of the present invention. One such structure, adapted to a subtractive method of colored image formation, comprises, in order of incidence of the light of a photographic exposure, such as would occur in a direction toward the front surface of FIG. 4, a transparent base layer, a transparent image-receiving layer, a blue-sensitive silver halide emulsion layer, a layer containing a yellow dye, a green-sensitive silver halide emulsion layer, a layer containing a magenta coupler, a red-sensitive halide emulsion layer, and a layer containing a cyan coupler, the latter being contiguous with the opaque cover sheet 112 and the liquid container 116. Assuming exposure to a multicolored subject and imbibition of the released processing liquid into at least the several emulsion layers, image-forming substances in substantially undeveloped areas of the photographically exposed blue-green-sensitive and red-sensitive emulsions are caused to diffuse to the image-receiving layer to provide, in the latter, registered color-separation images in yellow, magenta, and cyan, respectively. The several layers and cover sheet, in bonded unitary relation, are stripped from the image-receiving layer, after completion of the processing step, leaving the latter layer, containing the multicolored image and integral with the transparent base layer, as a full-color transparency.

Another film construction suitable for inclusion in the film assembly of the invention, for producing a multi-colored transparency by an additive synthesis, comprises, in order of reception of the light rays of a photographic exposure, a transparent base layer, an additive color screen layer composed, for example, of red, green and blue transparent screen components arranged geometrically or as an irregular mosaic, a transparent image-receiving layer, and a photo-sensitive silver halide emulsion layer which may, appropriately, be a panchromatic emulsion, the latter layer being contiguous with the cover sheet 112 and the liquid container 116. After completion of the exposure and processing steps, the emulsion layer and the cover sheet 112 are stripped, together, from the image-receiving layer. The multicolored transparency comprising, in order, the base, color screen, and image-receiving layer, remains fixed in the mount 100. While specific film assembly constructions have been described herein, it is to be understood that further modifications thereof are possible within the scope of the invention.

In FIG. 6 the magazine 80 is shown mounted in the camera front or frontal housing. Assuming the camera to be closed instead of open, as shown, by manually pulling the handle 30 and the arms 48 through the medium of the shaft 50 interconnecting the arms and handle, a foremost exposed film assembly 98, with the cover sheet 112 overlying its rear surface, has been drawn from the magazine. As illustrated, the container 116 of the processing liquid has passed the pressure rolls 46 and 58, the latter being understood to be at adjacent operative position, the liquid has been released and spread across the film assembly emulsion, and the camming portions 48b of arms 48 are about to contact the pressure roll flanges 58b, thereby forcing the pressure rolls slightly apart so as to terminate spreading of the processing liquid for a so-called liquid holding or "trapping" purpose. The film assembly is shown at a position where it would be approximately entering the storage chamber 64. The flanges 90a of the magazine will be noted as having a positioning and locking relation with the members 44 of the wall elements 42.

The structure of the film-assembly transport arms 48, the connecting shaft 50 and the handle 30, with associated mechanism, is shown in detail in FIGS. 7–11. A unitary projection 50a of the shaft is attached to the rear face of the cross-member 49, integral with the arms 48, by a pair of screws or rivets 119, thus connecting the handle and bar with the transport arms.

In transporting each film assembly from the focal plane at 40, between the pressure rolls 46 and 58 and to the storage chamber 64, it is essential that a complete cycle be performed before the next film assembly in the magazine is similarly treated. This is true for several reasons. In the first place, a continuous even movement of the film assembly between the pressure rolls is necessary to effect a correct spreading of the processing liquid and satisfactory image formation. Secondly, any return of the transport arms inwardly so as to engage a succeeding film assembly prior to completing processing of its predecessor by pulling the handle 30 outwardly to its limit, as established by contact of the lugs 55 with the extremities of the slots 56, might cause a jamming of the two film assemblies. This would necessitate opening the camera back to remedy the situation and risk a destructive exposure of the film assemblies. Means are therefore provided to prevent a return of the handle to the film-assembly-engaging position of FIGURE 1 or, more accurately, to prevent any inward movement thereof until the processing of a given film assembly has been completed and it has been deposited in the storage chamber 64. As illustrated from the front in FIGS. 8–11, the bar or shaft 50 is a channeled element of a modified U shape, comprising a flat central portion 50b and two forwardly-turned, longitudinally-extending flange portions 50c. A first pair of recesses or notches 120 is formed in inner, facing, opposite surfaces of the flanges adjacent to the handle 30. A second pair of similar notches 122 is located adjacent to the end of the bar which is attached to the cross-piece 49. A flat spring member 124 composed, for example, of a resilient steel and having a length exceeding the spacing between the flanges 50c but slightly less than that existing transversely of the shaft 50 between the full depth of the notches 120 or 122 is attached at its center to a small block 126. The latter is fixedly mounted on the rear face of a frontal plate 128 of the camera front 12. From the aforesaid structure, the shaft 50 and attached cross-piece 49 will be noted as moving longitudinally in a chamber or compartment formed between the frontal plate 128 and the rear platform 52.

At the maximum inward position of the handle 30 and shaft 50, the tips of the spring 124 are located within the pair of notches 120, the spring thus being extended to its maximum length in a straightened condition, as shown in FIG. 8. FIG. 9 illustrates outward movement of the handle 30, shaft 50 and arms 48 in the direction of the arrow 130, namely, in a direction providing movement of a film assembly 98 between the pressure rolls, as shown in FIG. 6. The spring 124 has been bowed in the manner shown, through the action of the moving notches 120 relative to the spring extremities. The spring tips now bear forcefully against the inner surfaces of the flanges 50c in a holding or binding manner and to a degree such that the shaft cannot be moved inwardly in a direction opposite to that of the arrow 130.

In FIG. 10, the handle 30, shaft 50 and arms 48 are illustrated at their maximum outward positions as determined by contact of transverse end portions 53 of the arms with the ends 56a of the slots 56, the aforesaid elements constituting a limit-stop means. The processing cycle of the film assembly 98 has thereby been completed and the latter has been deposited in the storage chamber. The spring 124, with its extremities resting in the notches 122, has again been straightened and the handle, rod and transport arms are thus permitted to commence an inward movement to ultimately enable the lugs 55 to engage another film assembly at the focal plane. Movement in the last-named direction, that is, in the direction of the arrow 132, is illustrated in FIG. 11, the spring 124 being correctly bowed to permit such a movement. While the inner surfaces of the flanges 50c are preferably smooth, they may be rendered somewhat uneven or minutely notched to heighten the binding action of the spring 124 relative thereto.

Figure 12:
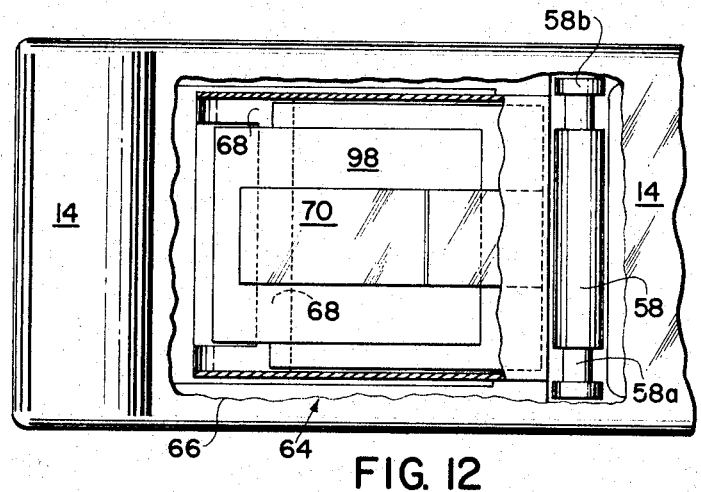
FIG. 12 is a fragmentary rear view of the camera back with housing portions broken away to illustrate the deposition of a film assembly in the storage chamber.

In FIG. 12, the deposition of a film assembly 98 from the pressure rolls 46 and 58 into the storage chamber 64 through movement of the handle 30 to its maximum outward position is illustrated from the rear, the rear wall of the camera back 14 having been partially broken away to reveal the cointained film assembly and the functional chamber components. The latter include the resilient guide and holding spring member 70, the transverse frontal holding plate 68 and the side-wall members 66, the film assembly 98 being introduced between and firmly held by the aforesaid elements.

Figure 14:
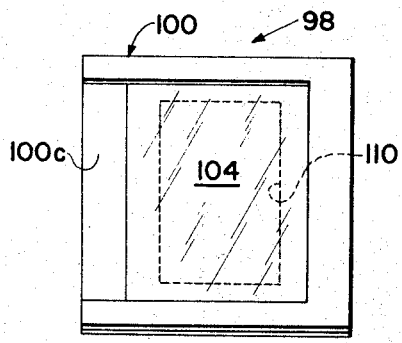
FIG. 14 is a diagrammatic front view of an individual film assembly which has been exposed, processed and made ready for projection.

In FIG. 13, the camera is shown from the rear with the storage chamber 64 shown swung to open position on the hinge 74, through release of the latch elements 76 and 78. One or more of the processed film assemblies 98 are ready to be manually removed from the storage chamber. After removal of a film assembly, its cover sheet 112 and emulsion layer are stripped away together. This is permitted because the emulsion layer adheres more firmly to the solidified processing liquid and cover sheet than it does to the image-receiving layer. The transparent image-receiving layer, integral with the base layer, or in a modification, with an intervening color screen, constitutes the completed transparency. The tab 100c is then folded over rearwardly at the semi-perforation 102. The pressure-sensitive adhesive 114 previously underlying the liquid container 116 reatins its bonding properties and holds the tab firmly attached to the front section of the mount and to a marginal portion of the transparency, as shown in FIG. 14. The transparency, thus completely mounted, is ready to be projected in any standard 35 mm. or 2 x 2 projector.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A miniature camera for use with a plurality of film assemblies releasably carried in a magazine adapted to be mounted in said camera, each of which film assemblies includes, respectively, a photosensitive emulsion, means providing an image-receiving layer, a substantially rigid slide-mount, and a releasably-confined processing liquid, the camera, in conjunction with a film assembly of said category, being adapted through a diffusion transfer process to produce a finished transparency, ready-mounted for projection, said camera comprising a frontal housing and a rear housing, the latter providing a closure for the open back of said frontal housing, said frontal housing including, adjacent to its front surface, film-assembly exposure means comprising a lens, shutter and diaphragm assembly with actuating means therefor, and, adjacent to its rear surface, a substantially planar longitudinally-extending platform for supporting and permitting slidable movement of said film assemblies thereacross, an exposure aperture formed in said planar platform adjacent to one end thereof and leading forwardly to said lens, shutter and diaphraghm assembly, a plurality of rearwardly-projecting wall-like members disposed around said exposure aperture including a plurality of further rearwardly-extending flange portions for engaging portions of said magazine adapted to mate therewith and position and lock said magazine in the camera in a manner such that a foremost film assembly is located at a focal plane in readiness for a photographic exposure and a narrow slot-like aperture is formed between said magazine and platform through which said foremost film assembly can be withdrawn sideways from said magazine after said exposure, a transverse elongated recess formed in said planar platform adjacent to said slot-like aperture, an elongated compression-applying member mounted in said recess so that its bearing surface projects rearwardly slightly beyond the plane of said planar platform, said compression-applying member acting in conjunction with a second elongated compression-applying member of said camera positionable adjacent thereto to bear against each film assembly and effect the release and spreading of said processing liquid therewithin during its movement between said compression-applying members, one of said compression-applying members being mounted for translational movement and being biased toward the other, and mechanism for transporting each film assembly while concurrently alternately widening and reestablishing a functional compressive spacing between said compression-applying members in a programmed operation, said mechanism comprising elongated arm means mounted for longitudinal slidable movement in channel means formed in said planar platform so as to extend longitudinally thereof, lug means integral with and projecting rearwardly from an extremity of said arm means adapted to engage the slide-mount component of each said film assembly for slidably withdrawing an exposed film assembly from said magazine and for drawing it between compression-applying members to a location permitting its removal from the camera, camming means integral with said arm means for predeterminedly bearing against a surface associated with said compression-applying member which is mounted for translational movement for widening said spacing between said compression-applying members at predetermined stages of movement of said film assembly, and means for actuating said film-assembly transport mechanism.

2. A miniature camera, as defined in claim 1, wherein said means for actuating said film-assembly transport mechanism comprises an elongated shaft attached at one extremity to means connected to said elongated arm means and projecting through a slot formed in one end of said frontal housing to a location exteriorly thereof, and attached at its other extremity to a handle which is adapted to be drawn manually outwardly for effecting processing of a first film assembly and pushed inwardly of said housing to a return position.

3. A miniature camera, as defined in claim 1, wherein said frontal and rear housings are pivotally attached to each other at one end of the camera and adapted to be releasably latched at the other end, and wherein said compression-applying member mounted for translational movement is thus mounted on said rear housing and brought to its functional location with respect to said compression-applying member mounted in said frontal housing by pivoting said housings together to a latched condition.

4. A miniature camera, as defined in claim 3, wherein said compression-applying members are rotatably mounted pressure rolls and wherein peripheral flange means of said roll mounted for translational movement is adapted to be contacted by said camming means of said arm means for widening said spacing between said rolls.

5. A miniature camera, as defined in claim 4, wherein said roll which is mounted for translational movement is rotatably mounted between the ends of a pair of arms which latter are pivotally mounted at their opposite ends on said rear housing.

6. A miniature camera, as defined in claim 1, wherein said film-assembly exposure means includes finder means pivotally-mounted on said front section and alternatively positionable to a viewing position on the top of said camera and to a position in a recess formed in the front surface of said frontal housing for achieving a compactness when carrying said camera.

7. A miniature camera, as defined in claim 1, wherein said film-assembly exposure means includes a releasably-mounted, rectangular flashgun, slidably positionable to an operative location in a rectangularly-shaped recess formed in the front surface of said frontal housing.

8. A miniature camera, as defined in claim 1, wherein is adapted to be mounted said magazine in the form of a rectangular box-like structure with bottom, side- and end-wall members having, respectively, a substantially open front intended to be positioned facing said exposure aperture, a pair of channels extending longitudinally along said side-wall members adjacent to said open front for releasably retaining said film assemblies, a pair of cut-out areas formed in each end-wall member at the extremities of said channels, laterally outwarding- and forwardly-extending flange means for cooperative engagement by said rearwardly-extending flange portions of said wall-like members of the camera, and compression spring means bearing against said bottom wall member for biasing said film assemblies toward said channels, said open face of the magazine, and said exposure aperture, respectively, said cut-out areas being adapted to permit unobstructed movement of said lugs of said film-transporting mechanism along the longitudinal margins of said open front, and said channels both establishing the position of a foremost film assembly for photographic exposure and, thereafter, permitting the slidable withdrawal of said film assembly by contact of said lugs with a trailing edge of said film assembly.

9. A miniature camera, as defined in claim 1, wherein said rearwardly projecting wall-like members which contribute to position and lock said magazine in said camera surround three sides of said magazine, whereby that end-wall member of said magazine adjacent which exists said slot-like aperture is unobstructed for slidable withdrawal of a foremost film assembly therefrom.

10. A miniature camera, as defined in claim 1, wherein said channel means in part underlie two of said well-like members and in part underlie said platform and wherein said elongated arm means of said film-assembly transporting mechanism consists of a pair of laterally-spaced parallel arm elements connected at one extremity by an integral cross-piece and adapted to longitudinal movement in said channel means, said means for actuating said film-assembly transport mechanism comprising a handle, a U-shaped shaft interconnecting said handle and cross-piece, and a U-shaped slot formed in an end of said frontal housing through which said shaft is adapted to slidable movement.

11. A miniature camera for use with a plurality of film assemblies releasably carried in a magazine adapted to be mounted in said camera, each of which film assemblies includes, respectively, a photosensitive emulsion, means providing an image-receiving layer, a substantially rigid slide-mount, and a releasably-confined processing liquid, the camera, in conjunction with a film assembly of said category, being adapted through a diffusion transfer process to produce a finished transparency, ready-mounted for projection, said camera comprising a frontal housing and a rear housing, the latter providing a closure for the open back of said frontal housing and including a storage chamber having access means for accommodating a plurality of said film assemblies after they have been photographically exposed and processed in said camera, said frontal housing including, adjacent to its front surface, a lens, shutter and diaphragm assembly with actuating means therefor, and, adjacent to its rear surface, a substantially planar longitudinally-extending platform for supporting and permitting slidable movement of said film assemblies thereacross, an exposure aperture formed in said planar platform adjacent to one end thereof and leading forwardly to said lens, shutter and diaphragm assembly, a plurality of rearwardly-projecting wall-like members disposed around said exposure aperture including a plurality of further rearwardly-extending flange portions for engaging portions of said magazine adapted to mate therewith and position and lock said magazine in the camera in a manner such that a foremost film assembly is located at a focal plane in readiness for a photographic exposure and a space is provided between said magazine and said planar platform of the camera in the form of a narrow slot-like aperture through which said foremost film assembly can be withdrawn sideways from said magazine after said exposure, a transverse elongated recess formed in said planar platform adjacent to said slot-like aperture, an elongated compression-applying member mounted lengthwise in said recess so that its bearing surface projects rearwardly slightly beyond the plane of said planar platform, said compression-applying member acting in conjunction with a second elongated compression-applying member of said camera positionable adjacent thereto to bear against each film assembly and effect the release and spreading of said processing liquid therewithin during its movement between said compression-applying members, one of said compression-applying members being mounted for translational movement and being spring-biased toward the other, and mechanism for transporting each film assembly while concurrently alternately widening and reestablishing a functional compressive spacing between said compression-applying members in a programmed operation, said mechanism comprising elongated arm means mounted for longitudinal slidable movement in channel means formed in said planar platform so as to extend longitudinally thereof, lug means integral with and projecting rearwardly from an extremity of said arm means adapted to engage the slide-mount component of each said film assembly for slidably withdrawing an exposed film assembly from said magazine and for drawing it between said compression-applying members to a location permitting its removal from the camera, camming means integral with said arm means for predeterminedly bearing against a surface associated with said compression-applying member which is mounted for translational movement for widening said spacing between said compression-applying members at predetermined stages of movement of said film assembly, and means for actuating said film-assembly transport mechanism.

12. A miniature camera, as defined in claim 11, wherein said storage chamber is located in a recess of said camera rear housing which, when said frontal and rear camera housing are at closed position, lies immediately adjacent to said compression-applying members so as to accept each film assembly after its passage therebetween, said chamber including guide means and compressive means cooperating therewith to control a correct sequential positioning and holding of said film assemblies therewithin, said rear housing including a pivotal, releasably-latched rear-wall section forming a part of said chamber and constituting said access means thereinto.

13. A miniature camera, as defined in claim 12, wherein said guide means includes a pair of longitudinal side plates, a flared transverse plate extending therebetween, and a forwardly-extending flat spring member all mounted on said pivotal rear-wall section, each said film assembly being advanced by said transporting mechanism between said transverse plate and spring so as to be cumulatively stacked therebetween in said storage chamber.

14. A miniature camera, as defined in claim 13, wherein light-sealing means are provided adjacent to said compression-applying member which is mounted for translation movement.

15. A miniature camera, as defined in claim 14, wherein said compression-applying member is a pressure roll having a peripheral groove and a peripheral flange located at each exteremity outwardly of its film-assembly compressing central portion and wherein said light-sealing means includes a plate extending forwardly from said rear wall and a pair of curved resilient elements extending from the front of said plate into said peripheral grooves.

16. A miniature camera for use with a plurality of film assemblies releasably carried in a magazine adapted to be mounted in said camera, each of which film assemblies includes, respectively, a photosensitive emulsion, means providing an image-receiving layer, a substantially rigid slide-mount, and a releasably-confined processing liquid, the camera, is conjunction with a film assembly of said category, being adapted through a diffusion transfer process to produce a finished transparency, ready-mounted for projection, said camera comprising a frontal housing and a rear housing, the latter providing a closure for the open back of said frontal housing, said frontal housing including, adjacent to its front surface, a lens, shutter and diaphragm assembly with actuating means therefor, and, adjacent to its rear surface, a substantially planar longitudinally-extending platform for supporting and permitting slidable movement of said film assemblies thereacross, an exposure aperture formed in said planar platform adjacent to one end thereof which leads forwardly to said lens, shutter and diaphragm assembly a plurality of rearwardly-projecting wall-like members disposed around said exposure aperture including a plurality of further rearwardly-extending flange portions for engaging portions of said magazine adapted to mate therewith and position and lock said magazine in the camera in a manner such that a foremost film assembly is located at a focal plane in readiness for a photographic exposure and a space is provided between said magazine and said planar platform of the camera in the form of a narrow slot-like aperture through which said foremost film assembly can be withdrawn sideways from said magazine after said exposure, a transverse elongated recess formed in said planar platform adjacent to said slot-like aperture an elongated compression-applying member mounted lengthwise in said recess so that its bearing surface projects rearwardly slightly beyond the plane of said planar platform, said compression-applying member acting in conjunction with a second elongated compression-applying member of said camera positionable adjacent thereto to bear against each film assembly and effect the release and spreading of said processing liquid therewithin during its movement between said compression-applying members, one of said compression-applying members being mounted for translational movement and being spring-biased toward the other, and mechanism for transporting each film assembly while concurrently alternately widening and reestablishing a functional compressive spacing between said compression-applying members in a programmed operation, said mechanism comprising elongated arm means mounted for longitudinal slidable movement in channel means formed in said planar platform so as to extend longitudinally thereof, lug means integral with and projecting rearwardly from an extremity of said arm means adapted to engage the slide-mount component of each said film assembly for slidably withdrawing an exposed film assembly from said magazine and for drawing it between said compressive-applying members to a location permitting its removal from the camera, camming means integral with said arm means for predeterminedly bearing against a surface associated with said compression-applying member which is mounted for translational movement for widening said spacing between said compression-applying members at predetermined stages of movement of said film assembly, means for actuating said film-assembly transport mechanism in a given direction for processing said film assemblies and in an opposite return direction, and means for locking said actuating means against moving in said return direction until it has undergone a complete cycle of movement in said given processing direction.

17. A miniature camera, as defined in claim 16, wherein said means for actuating said film-assembly transport mechanism is an elongated shaft having a pair of overturned flanges extending along both edges throughout substantially its length to provide a broadened U shape, means connecting said shaft to said arm means, a slot formed in an end of said frontal housing for permitting slidable movement of said shaft back-and-forth therethrough and a light-tight contact therewith, and a handle attached to an end of said shaft externally of said frontal housing for manual actuation, said handle when commencing movement at its maximum inward location contiguous with said frontal housing end and drawn to its maximum outward location, as determined by limit-stop means engaging said mechanism, producing said complete cycle of movement of a given film assembly in said given processing direction, and when returned to said maximum inward location providing engagement by said mechanism of a succeeding film assembly for commencing an identical cycle of movement relative thereto.

18. A miniature camera, as defined in claim 17, wherein said limit-stop means consists of portions of said platform forming the ends of said channels and transverse extensions of said arms at their extremities which are adapted to be brought into contact with one another when said handle is drawn to its maximum outward location.

19. A miniature camera, as defined in claim 17, wherein said means for locking said actuating means is composed of a first pair of notches formed in inwardly-facing, directly-opposite surfaces of said flanges adjacent to the outer extremity of said shaft, a second pair of notches formed in inwardly-facing, directly-opposite surfaces of said flanges adjacent to the inner extremity of said shaft and a flat spring element fixedly mounted at its center on said frontal housing with its ends free to move and bearing against the inner facing surfaces of said flanges, said spring element having a straightened length approximately equal to the distances between the maximum depth of each notch of a given pair of notches, the ends of said spring element being located in said pair of notches adjacent to the outer extremity of said shaft when said handle is at its maximum inward location, and said ends being carried outwardly by said notches when said handle is drawn outwardly whereby said spring element is bowed outwardly and its ends bear against said inner flange surfaces permitting outward movement of said shaft but exerting a locking action preventing a return movement of said shaft until the ends of said spring element have entered said pair of notches adjacent to the inner extremity of said shaft, at which stage, when said handle is pushed inwardly, said spring ends are carried inwardly by said notches whereby said spring element is bowed inwardly and permits a return of said shaft and handle to a maximum inward location.

20. A miniature camera, as defined in claim 19, wherein the length of said notches exceeds the width of said spring ends.

21. A miniature camera, as defined in claim 19, wherein said overturned flanges are thus overturned forwardly, and wherein said spring element is mounted on the inner surface of the forward wall of said frontal housing.

References Cited
UNITED STATES PATENTS
2,483,390  10/1949  Gannon _____ 95—13

JOHN M. HORAN, *Primary Examiner.*